United States Patent [19]

Brueckmann et al.

[11] Patent Number: 5,594,912
[45] Date of Patent: Jan. 14, 1997

[54] DIGITAL SIGNAL PROCESSING DEVICE WITH OPTIMIZED ALU CIRCUIT AND LOGIC BLOCK FOR CONTROLLING ONE OF TWO REGISTERS BASED ON THE CONTENTS OF THE MULTIPLICATION REGISTER

[75] Inventors: Dieter Brueckmann, Meerbusch; Walfried Preuss, Hoehenkirchen-Siegertsb, both of Germany

[73] Assignee: Siemens Aktiengesellschaft, Munich, Germany

[21] Appl. No.: 287,766

[22] Filed: Aug. 9, 1994

[30]    Foreign Application Priority Data

Aug. 9, 1993 [DE] Germany ............................ 43 26 732.7

[51] Int. Cl.$^6$ ........................................................ G06F 7/00
[52] U.S. Cl. ........................... 395/800; 364/736; 364/757; 364/748; 364/947.6; 364/258; 364/258.2; 364/259.5; 364/261; 364/DIG. 1
[58] Field of Search ..................................... 395/800, 375, 395/325; 364/715.01, 716, 736, 748, 754, 756, DIG. 1, DIG. 2

[56]    References Cited

U.S. PATENT DOCUMENTS

| | | | |
|---|---|---|---|
| 4,272,828 | 6/1981 | Negi et al. | 364/900 |
| 4,454,589 | 6/1984 | Miller | 364/716 |
| 4,613,935 | 9/1986 | Couleur | 395/375 |
| 4,622,650 | 11/1986 | Kulisch | 364/748 |
| 4,713,749 | 12/1987 | Magar et al. | 395/375 |
| 4,800,517 | 1/1989 | Asghar et al. | 364/757 |
| 4,815,021 | 3/1989 | Steiner et al. | 364/716 |
| 4,926,355 | 5/1990 | Boreland | 364/200 |
| 5,045,993 | 9/1991 | Murakami et al. | 395/375 |
| 5,282,153 | 1/1994 | Bartkowiak et al. | 364/716 |

FOREIGN PATENT DOCUMENTS 0540175  5/1993  European Pat. Off. .

*Primary Examiner*—Meng-Ai T. An
*Attorney, Agent, or Firm*—Herbert L. Lerner; Laurence A. Greenberg

[57]    ABSTRACT

A digital signal processing device includes at least one peripheral unit, a data bus and at least three data registers and a flag register exchanging binary-encoded data with the at least one peripheral unit through the data bus. Two shift registers are each loaded with contents of one of the data registers. Two modification units are each connected downstream stream of a respective one of the shift registers. An arithmetic and logic unit is connected to the modification units. A multiplication register is to be written by the arithmetic and logic unit and through the data bus by the at least one peripheral unit. A logic block controls shift operations of at least one of the two shift registers as a function of contents of the multiplication register. A programmable sequence control is connected to the data registers, the at least one peripheral unit, the arithmetic and logic unit, the flag register, the shift registers, and the modification units.

18 Claims, 1 Drawing Sheet

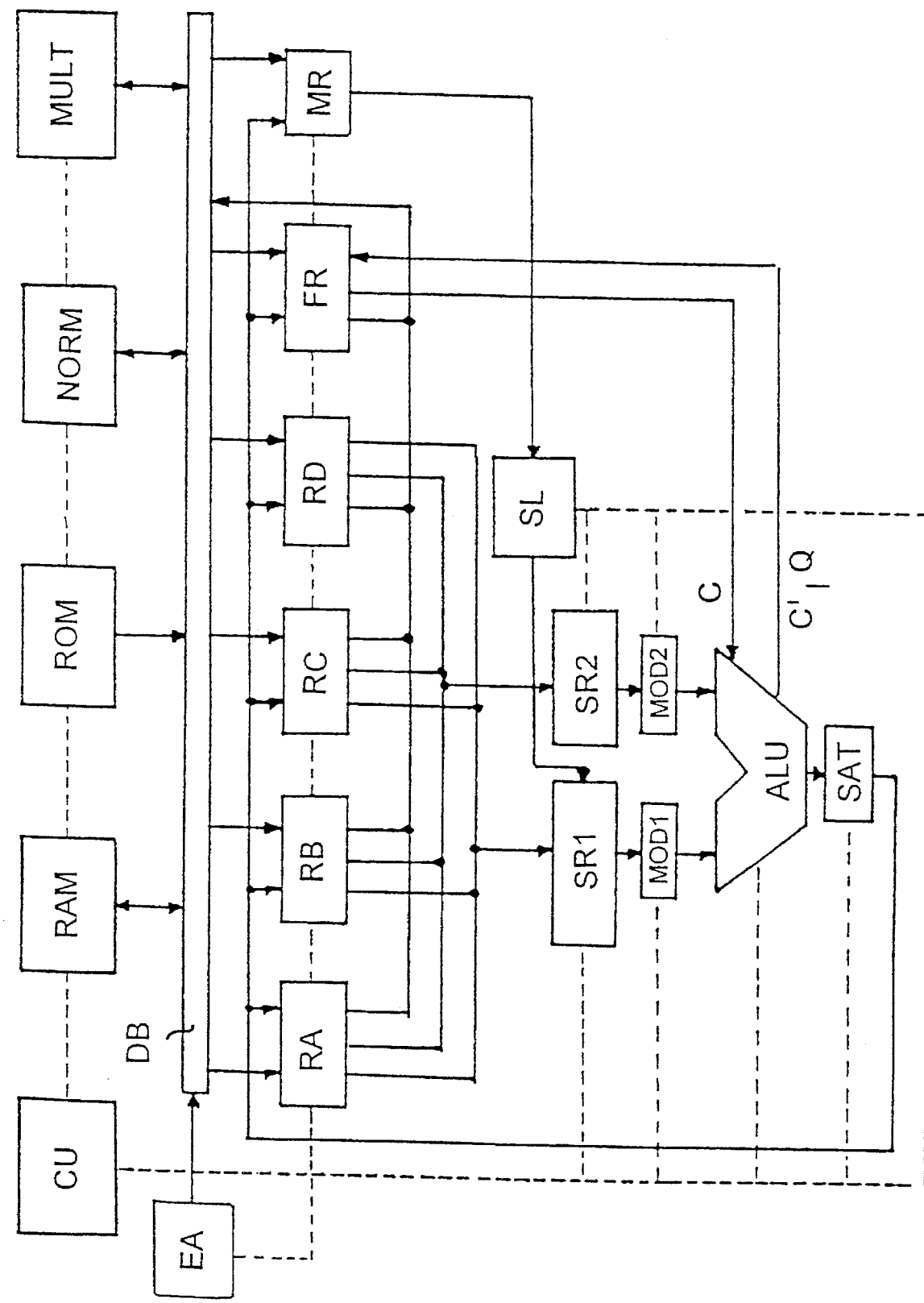

DIGITAL SIGNAL PROCESSING DEVICE WITH OPTIMIZED ALU CIRCUIT AND LOGIC BLOCK FOR CONTROLLING ONE OF TWO REGISTERS BASED ON THE CONTENTS OF THE MULTIPLICATION REGISTER

BACKGROUND OF THE INVENTION

Field of the Invention

The invention relates to a digital signal processing device, particularly for applications as an ADPCM codec.

Particularly for mobile communications, codecs are currently needed that carry out data reduction by half as compared with earlier codecs. One familiar method of data reduction is the ADPCM algorithm, which has already been standardized under CCITT Standard G.721 for a long time. One special feature of that algorithm is that only a very few multiplications and buffer storage operations are needed. Essentially, the only operations that have to be carried out are shift and addition operations and data format conversions, that is conversions from fixed point to floating point representation and vice versa. Modern codecs should also enable convenient sound generation and offer a certain flexibility in implementation of additional functions.

Heretofore either standard signal processors or specially customized logic circuits were used to achieve codec functions. Typical multipurpose signal processor architectures currently being used are optimized for rapid execution of multiplication and buffer storage operations, but are less suitable for the ADPCM algorithm. In particular, format conversions and additional functions such as sound generation, echo compensation and so forth can be implemented only with comparatively great difficulty. Furthermore, the very powerful command set in a multipurpose signal processor is far from being fully exploited. That structure is accordingly not optimal from the standpoint of cost and power consumption. In that respect, structures with specially customized logic circuits are more favorable. However, they only offer very slight flexibility in terms of implementing additional functions.

SUMMARY OF THE INVENTION

It is accordingly an object of the invention to provide a signal processing device, which overcomes the hereinafore-mentioned disadvantages of the heretofore-known devices of this general type and which entails low expenditure for circuitry and has low power consumption, despite great flexibility.

With the foregoing and other objects in view there is provided, in accordance with the invention, a digital signal processing device, comprising at least three data registers and a flag register which exchange binary-encoded data with at least one peripheral unit through a data bus; two shift registers which are each loaded with the contents of one of the data registers; two modification units each being connected downstream of a respective one of the shift registers, the modification units, when controlled accordingly, invert an operand formed by the contents of the respective associated shift register, or replace it with its absolute value or with zero, or keep it unchanged; an arithmetic and logic unit which, when controlled accordingly, either adds together the two operands furnished by the modification units and an overflow bit stored in the flag register, stores the result of addition in one of the data registers and sets the overflow bit in the flag register depending on the presence of an overflow, or compares the operands with one another and stores the outcome of the comparison in the flag register; a multiplication register which is writable by the arithmetic and logic unit and by at least one peripheral unit through the data bus; a logic block which controls the shift operation of at least one of the two shift registers as a function of the contents of the multiplication register; and a programmable sequence control for program-dependent control of the data exchange between the data registers and at least one peripheral unit and between the flag register and at least one peripheral unit, and for program-dependent control of the operations of the shift registers, the modification unit and the arithmetic and logic unit.

In accordance with another feature of the invention, there is provided a saturation unit being connected downstream of the arithmetic and logic unit and being controlled accordingly by the sequence control for setting a data word at an output of the arithmetic and logic unit to a predetermined value.

In accordance with a concomitant feature of the invention, the peripheral units include a standardizing unit which converts data with fixed point representation into data with floating point representation and vice versa, a multiplication unit which multiplies two data words furnished to it through the data bus by one another and in turn outputs them through the data bus, and volatile and/or nonvolatile memory units.

Other features which are considered as characteristic for the invention are set forth in the appended claims.

Although the invention is illustrated and described herein as embodied in a signal processing device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE of the drawing is a block circuit diagram of an exemplary embodiment of the invention.

DESCRIPTION OF THE PREFERRED EMBODIMENTS

Referring now to the single figure of the drawing in detail, there is seen a digital signal processing device that has four data registers RA, RB, RC, RD and one flag register FR, which act through a data bus DB to exchange binary-encoded data with peripheral units, namely a volatile memory RAM, a standardizing unit NORM and a multiplication unit MULT. A nonvolatile memory ROM can also be read through the data bus DB. Two shift registers SR1 and SR2 which are also provided can each be connected to an output of one of the data registers RA, RB, RC, RD and then loaded with the contents of the respective data register. Each of the shift registers SR1 and SR2 is followed by one respective modification unit MOD1 and MOD2 which, when controlled accordingly, invert an operand formed by the contents of the respective associated shift register SR1 or SR2, or replace it with its absolute value or with zero, or keep it unchanged. The operands which are thus changed or are not changed are further processed by an arithmetic and logic unit ALU. To that end, with suitable control, the two changed or unchanged operands are either added together while taking into account an overflow bit C stored in the flag register FR, or are compared with one another. As applicable, an overflow bit arising in the addition, or the result of the comparison, is indicated by a setting of respective corresponding bits C', Q in the flag register FR, and the result of addition is carried to one of the data registers RA, RB, RC, RD, through a saturation unit SAT which, when controlled accordingly, sets a data word at an output of the arithmetic and logic unit ALU to a predetermined value, such as a maximum value.

A programmed sequence control CU controls all of the functions of the signal processing device as a function of the program, or in other words it controls the data exchange between the data registers and the peripheral units, the data exchange between the flag register and the peripheral units, and the operations of the shift registers SR1, SR2, the modification units MOD1, MOD2, the arithmetic and logic unit ALU, and the saturation unit SAT. The sequence control CU controls a multiplication register MR, which is writable by the arithmetic and logic unit ALU and by at least one peripheral unit through the data bus. The sequence control CU also controls a logic block SL, which controls the shift operation of the shift register SR1 as a function of the contents of the multiplication register MR.

Data words to be associated with certain signals are written into the volatile memory RAM under the control of the sequence control CU, through an input/output unit EA, for instance, which is also connected to the data bus DB. The data words stored in the volatile memory RAM and in the nonvolatile memory ROM are delivered to the standardizing unit NORM, the multiplication unit MULT, and the data registers RA and RB, for example. Next, the contents of the data registers RA and RB are written into the respective shift registers SR1 and SR2. The contents of the shift register SR1 can be shifted by the logic block SL to the left or the right by from 0 to 15 bits, depending on the contents of the multiplication register MR. The shift register SR2 is controlled exclusively by the sequence control CU and allows shift operations by 1 bit to the right and 15 bits to the left. Moreover, the shift register SR1 is also controllable by the sequence control CU, independently of the logic block SL. Once the shift operations are completed, the two operands present in the shift registers SR1 and SR2 are processed by the modification units MOD1 and MOD2. For instance, based on instructions by the program, the operand in the modification unit MOD1 is not changed, and the operand in the modification unit MOD2 is inverted. Next, the two operands are added together and the overflow bit C, if set in the flag register FR, is added to them as well. An overflow, if it occurs, is indicated by the setting of the applicable bit C in the flag register FR. The result of the addition is written into the data register RC through the saturation unit SAT, which in this case, as programmed, does not become active. Simultaneously with these operations, a data conversion was carried out by the standardizing unit NORM, for instance from floating point representation to fixed point representation, and multiplication was performed by the multiplication unit MULT. The outcome of the multiplication is written into the data register RD, and the outcome of the conversion is written into the data register RA, whereupon the contents of the data registers RC and RD, for example, are transferred to the shift registers SR1 and SR2.

It can be seen from this explanation that great flexibility is achieved, at little cost for circuitry and therefore with low energy consumption. This is due above all to the low number of operations that are possible, combined with parallel processing of time-consuming operations. Naturally, as needed, other peripheral units may be added, or unnecessary peripheral units may be omitted.

We claim:
1. A digital signal processing device, comprising:
at least one peripheral unit;
a data bus;
at least three data registers and a flag register exchanging binary-encoded data with said at least one peripheral unit through said data bus;
two shift registers each being loaded with contents of one of said data registers;
two modification units each being connected downstream of a respective one of said shift registers;
an arithmetic and logic unit connected to said modification units;
a multiplication register coupled to said data bus and output of said arithmetic and logic unit, said multiplication register to be written by said arithmetic and logic unit and by said at least one peripheral unit;
a logic block controlling shift operations of at least one of said two shift registers as a function of contents of said multiplication register; and
a programmable sequence control connected to said data registers, said at least one peripheral unit, said arithmetic and logic unit, said flag register, said shift registers, and said modification units for controlling data exchange between said data registers or said flag register and said at least one peripheral unit, and for controlling operations of the shift registers, the modification units and the arithmetic and logic unit.

2. The signal processing device according to claim 1, including means for controlling said modification units to invert an operand formed by the contents of a respective one of said shift registers associated therewith.

3. The signal processing device according to claim 1, including means for controlling said modification units to replace an operand formed by the contents of a respective one of said shift registers associated therewith with a corresponding absolute value.

4. The signal processing device according to claim 1, including means for controlling said modification units to replace an operand formed by the contents of a respective one of said shift registers associated therewith with zero.

5. The signal processing device according to claim 1, including means for controlling said modification units to keep an operand formed by the contents of a respective one of said shift registers associated therewith unchanged.

6. The signal processing device according to claim 1, including means for controlling said arithmetic and logic unit for adding together two operands furnished by said modification units and an overflow bit stored in said flag register, for storing a result of addition in one of said data registers and for setting the overflow bit in said flag register in dependence on a presence of an overflow.

7. The signal processing device according to claim 1, including means for controlling said arithmetic and logic unit for comparing two operands furnished by said modification units with one another and storing an outcome of the comparison in said flag register.

8. The signal processing device according to claim 1, wherein said programmable sequence control has means for program-dependent control of data exchange between said data registers and said at least one peripheral unit.

9. The signal processing device according to claim 1, wherein said programmable sequence control has means for program-dependent control of data exchange between said data registers and said arithmetic and logic unit.

10. The signal processing device according to claim 1, wherein said programmable sequence control has means for program-dependent control of data exchange between said flag register and said at least one peripheral unit.

11. The signal processing device according to claim 1, wherein said programmable sequence control has means for program-dependent control of data exchange between said flag register and said arithmetic and logic unit.

12. The signal processing device according to claim 1, wherein said programmable sequence control has means for program-dependent control of operations of said shift registers, said modification units and said arithmetic and logic unit.

13. The signal processing device according to claim 1, including a saturation unit connected downstream of said arithmetic and logic unit and controlled by said programmable sequence control for setting a data word at an output of said arithmetic and logic unit to a predetermined value.

14. The signal processing device according to claim 1, wherein said at least one peripheral unit includes a peripheral unit being a standardizing unit for converting between data with fixed point representation and data with floating point representation.

15. The signal processing device according to claim 1, wherein said at least one peripheral unit includes a peripheral unit being a multiplication unit multiplying two data words by one another.

16. The signal processing device according to claim 1, wherein said at least one peripheral unit includes volatile and nonvolatile memory units.

17. The signal processing device according to claim 1, wherein said at least one peripheral unit includes volatile memory units.

18. The signal processing device according to claim 1, wherein said at least one peripheral unit includes nonvolatile memory units.

* * * * *